United States Patent [19]

Shimoma et al.

[11] 4,226,513

[45] Oct. 7, 1980

[54] EXPOSURE DEVICE FOR MAKING A STRIPE SCREEN ON A FACEPLATE OF A COLOR CATHODE RAY TUBE

[75] Inventors: Taketoshi Shimoma; Kumio Fukuda, both of Fukaya, Japan

[73] Assignee: Tokyo Shibaura Electric Co., Ltd., Kawasaki, Japan

[21] Appl. No.: 858,814

[22] Filed: Dec. 8, 1977

[30] Foreign Application Priority Data

Dec. 11, 1976 [JP] Japan ................................ 51-148305

[51] Int. Cl.[3] ......................... G03B 41/00; G03C 5/00

[52] U.S. Cl. ........................................... 354/1; 430/24; 430/26

[58] Field of Search .................. 354/1; 430/23, 24, 26

[56] References Cited

U.S. PATENT DOCUMENTS

| | | | |
|---|---|---|---|
| 3,900,854 | 8/1975 | Osakabe et al. | 354/1 |
| 3,925,700 | 12/1975 | Saito | 354/1 X |
| 4,001,842 | 1/1977 | Suzuki et al. | 354/1 |
| 4,078,239 | 3/1978 | Prazak et al. | 354/1 |
| 4,099,848 | 7/1978 | Osakabe | 354/1 X |

*Primary Examiner*—John Gonzales
*Attorney, Agent, or Firm*—Cushman, Darby & Cushman

[57] ABSTRACT

An exposure device for making a stripe screen on a faceplate of a color cathode ray tube which comprises an elongated light source; first and second correction lenses disposed above the light source in the order mentioned as counted from said elongated light source; and a table designed to carry a panel section of the color cathode ray tube and bored with an opening facing the second correction lens, and wherein the first correction lens has a lenticular plane enabling a virtual image of the light source to be rotated according to the direction in which an image of the light source is to be projected through the prescribed angle defined by the curvature of the shadow mask and the apparent angle of spatial displacement of an image of the elongated light source projected through the second correction lens; and the second lens has a lenticular plane enabling said virtual image to be projected on a photosensitive layer of the panel section aligned with the locus of electron beams of the color cathode ray tube through the apertures of a shadow mask fitted to said panel section.

5 Claims, 6 Drawing Figures

FIG. 1
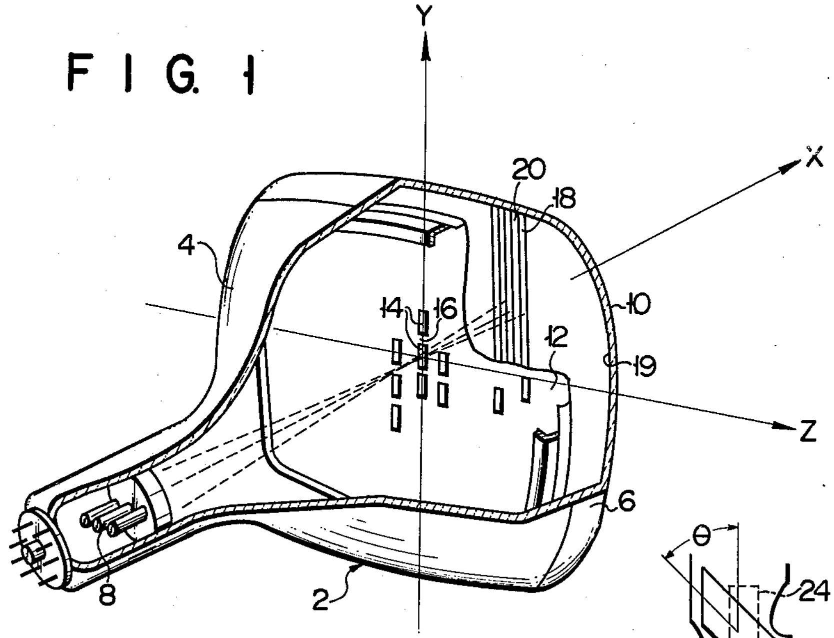
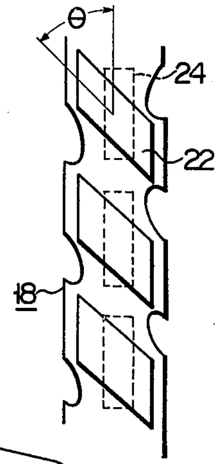
FIG. 2
FIG. 3
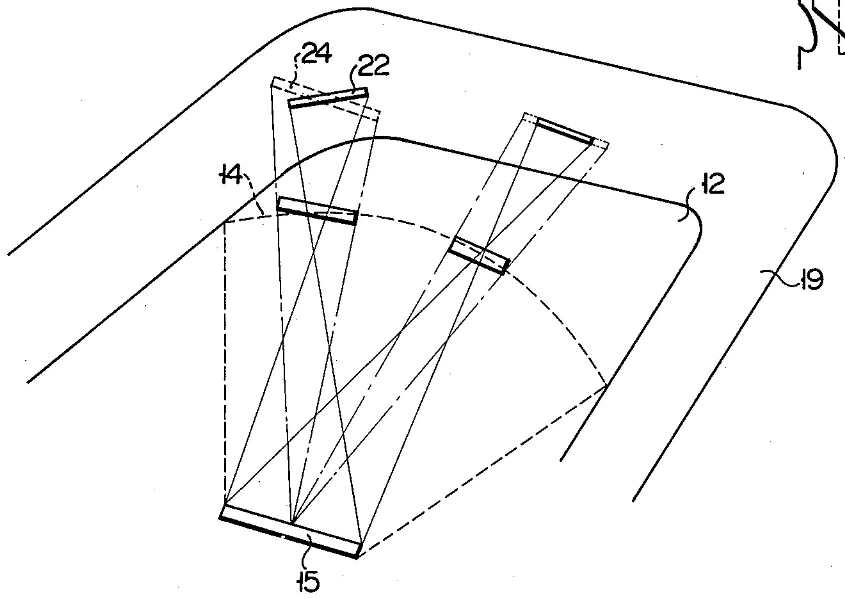

EXPOSURE DEVICE FOR MAKING A STRIPE SCREEN ON A FACEPLATE OF A COLOR CATHODE RAY TUBE

This invention relates to an exposure device for making a stripe screen on a faceplate of a color cathode ray tube. As is well known, a color cathode ray tube equipped with, for example, an in-line electron gun assembly has a structure as schematically illustrated in FIG. 1. The color cathode ray tube comprises a funnel section 4 and panel section 6, which are sealed together to provide a bulb 2. A neck portion of the funnel section 4 receives in-line electron guns 8 arranged along the X-axis. A shadow mask 12 is so placed in the panel section 6 as to face the backside of a faceplace 10 of said panel section 6. The shadow mask 12 has a plurality of slit apertures 14 extending along the Y axis and bridges 16 left between the respective slit apertures 14. Provided on the inner surface 11 of the faceplate 10 is a luminescent screen 19 formed of alternately arranged phosphor stripes 18 and light-absorbing stripes 20 both extending along the Y axis.

Phosphor stripes 18 formed on the inner surface 11 of the faceplate 10 of the above-mentioned color cathode ray tube are generally photographically prepared by an exposure device. This photographic process comprises the steps of depositing a photosentive layer on the inner surface 11 of the faceplate; setting the shadow mask 12 to face the inner surface 11 of the face plate 10; and projecting a light on the photosensitive layer from an elongated light source or a linearly traveling point light source, followed by etching. Application of the enlongated light source or linearly traveling point light source is for the object of forming continuous phosphor stripes 18. Where the point light source is set immovable, a light passing through the slit aperture 14 of the shadow mask 12 is projected only on that portion of the photosensitive layer which faces said slit apertures 14. That portion of the photosensitive layer which faces the bridge 16 is not exposed to a light. Where, however, a light is projected on the photosensitive layer from an elongated light source or a linearly traveling point light source, then even that portion of the photosensitive layer which faces the bridge 16 is exposed to a light; thereby providing a continuous phosphor stripe 18.

Already known is an exposure device using the enlongated light source or linearly traveling point light source. However, this prior art exposure device has the drawback that phosphor stripes 18 formed in the four corners of the faceplate 10 take the zigzag form, thereby reducing the color purity of a color cathode ray tube in said four corners. The above-mentioned zigzag form of phosphor stripes 18 is known to arise from the fact that a customarily manufactured shadow mask 12 does not have a flat plane, but a slightly curved plane projecting outward in the direction of the X axis. Since the shadow mask 12 has a slightly curved plane, the lateral sides of all the rectangular slit apertures 14 bored in said shadow mask 12 are not parallel with the axis of the enlongated light source 15. Slit apertures 14 formed particularly in the four corners of the shadow mask 12 have a prominently spatial displacement relationship with an elongated light source 15. This displacement relationship does not arise between the elongated light source 15 and the slit apertures 14 arranged along the Z and Y axes. Said displacement relationship becomes more noticeable with respect to slit apertures 14 positioned nearer to the four corners of the shadow mask 12. The displacement relationship causes the phosphor stripes 18 to take the zigzag form as illustrated in FIG. 2.

An exposure device intended to minimize the above-mentioned zigzag formation of phosphor stripes 18 is already set forth in the U.S. Pat. Nos. 3,889,145; 3,890,151; 3,971,043; and 4,001,842. However, these patented exposure devices were accompanied with the following drawbacks, failing fully to meet requirements demanded of an exposure device.

Since any of the proposed exposure devices produces a luminescent screen at a low rate, it is necessary to use many units thereof in order to manufacture a large number of color cathode ray tubes. The prior art exposure device is of complicated construction, presenting difficulties in maintenance, and failing always to manufacture a luminescent screen of uniform quality. Further disadvantage of the conventional exposure device is that an attempt to increase the power of a light source for elevation of the efficiency of fabricating a luminescent screen undesirably results in a decline in the service life of the light source.

It is accordingly the object of this invention to provice an exposure device which prevents phosphor stripes from being produced in the zigzag form in order to manufacture a color cathode ray tube with an excellent color purity characteristic.

According to an aspect of this invention, there is provided an exposure device for making a stripe screen on a faceplate of a color cathode ray tube, which comprises an elongated light source; a lens assembly formed of first and second correction lenses and disposed above said elongated light source; and a table positioned above the correction lens assembly, bored with an opening for allowing the passage of a light which has been emitted from the elongated light source through the correction lens assembly, and designed to carry a panel section of the color cathode ray tube fitted with a shadow mask having a large number of slit apertures, with that plane of a faceplate on which a stripe screen is to be formed so positioned as to face the correction lens assembly, and wherein the first correction lens has such a lenticular plane as causes a virtual image of the elongated light source projected by the second correction lens as viewed from a phosphor screen through the slit apertures of the shadow mask to be rotated as to define the prescribed angle with the actual image of the elongated light source according to the direction in which an image of the enlongated light source is to be projected; and a second correction lens has such a lenticular plane as projects the virtual image of the elongated light source along the locus of electron beams passing through the color cathode ray tube.

This invention can be more fully understood from the following detailed description when taken in conjunction with the accompanying drawings, in which:

FIG. 1 is a schematic oblique view, partly in section, of a cathode ray tube;

FIG. 2 schematically indicated part of a phosphor stripes to show that phosphor stripes formed in the four corners of a face plate of a cathode ray tube take the zigzag form;

FIG. 3 is a perspective view of the faceplate and shadow mask, showing that phosphor stripes formed in the four corners of the faceplate take the zigzag form;

Figure 4:
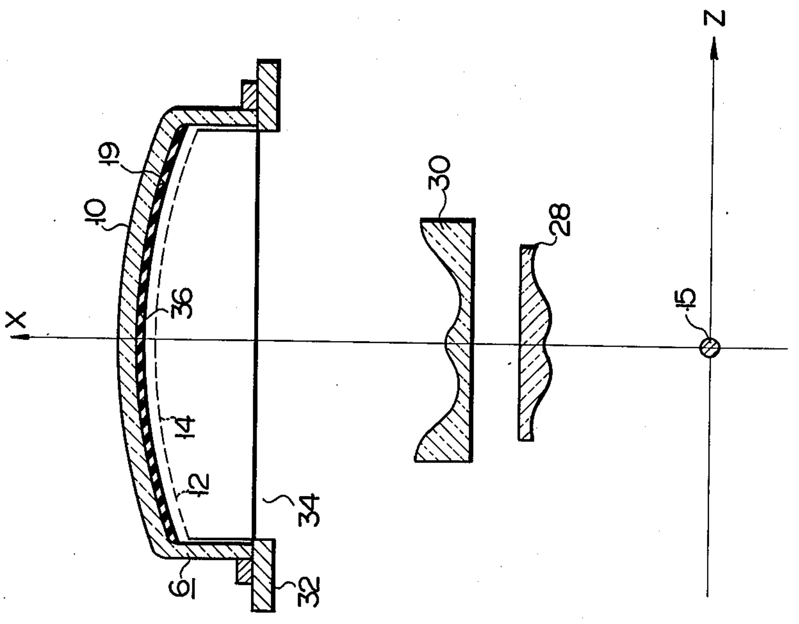
FIG. 4 is a schematic view of an exposure device embodying this invention.

FIG. 4 schematically shows an exposure device according to this invention for making a stripe screen on a faceplate of a color cathode ray tube. The parts of FIG. 4 the same as those of FIGS. 1 and 2 are denoted by the same numerals.

When represented by a three-dimensional coordinate, the elongated light source 15 of the exposure device of this invention is disposed on the Y axis (not shown) perpendicular to the X and Z axes. This elongated light source 15 may be replaced by a point light source traveling along the Y axis for a relatively small distance. Positioned above this elongated light source 15 are first and second correction lenses 28, 30 in the order mentioned as counted from said light source, with the center of said correction lenses 28, 30 aligned with the X axis.

A table 32 positioned above the correction lens assembly has an opening 34 spatially facing the second correction lens 30 in order to cause a light to be emitted from the elongated light source 15 to the photosensitive layer 36 coated on the backside of the faceplate 10 of the panel section 6. The panel section 6 fitted with the shadow mask 12 is mounted, as shown in FIG. 4, on the table 32 with the center of said panel section 6 aligned with the X axis. The luminescent screen 19 is formed on the inner surface of the faceplate 10 by etching the photosensitive layer 36.

Figure 6:
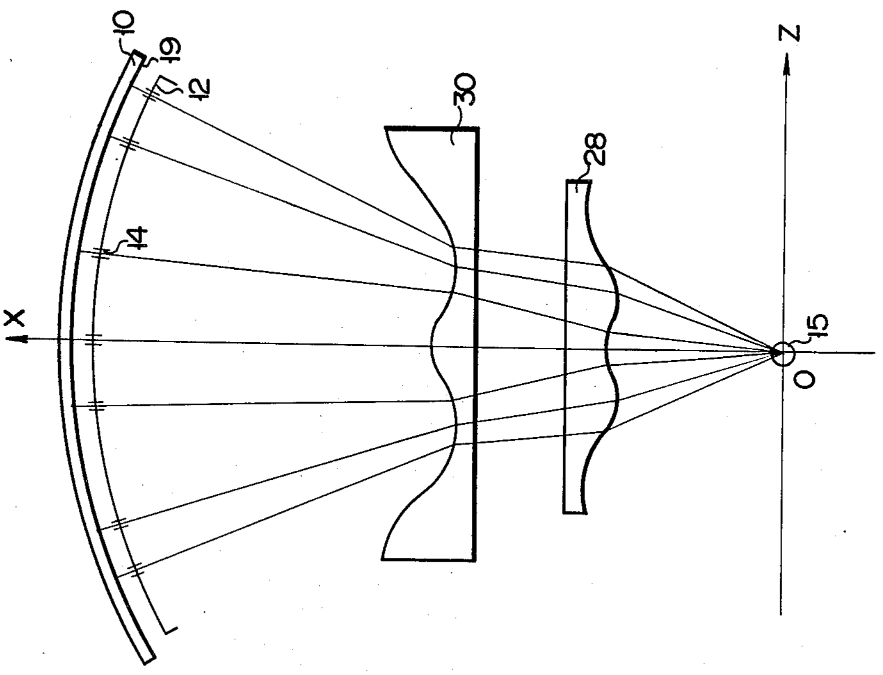
FIG. 6 sets forth the manner in which light beams are refracted by the first and second correction lenses used with the exposure device of the invention.
Figure 5:
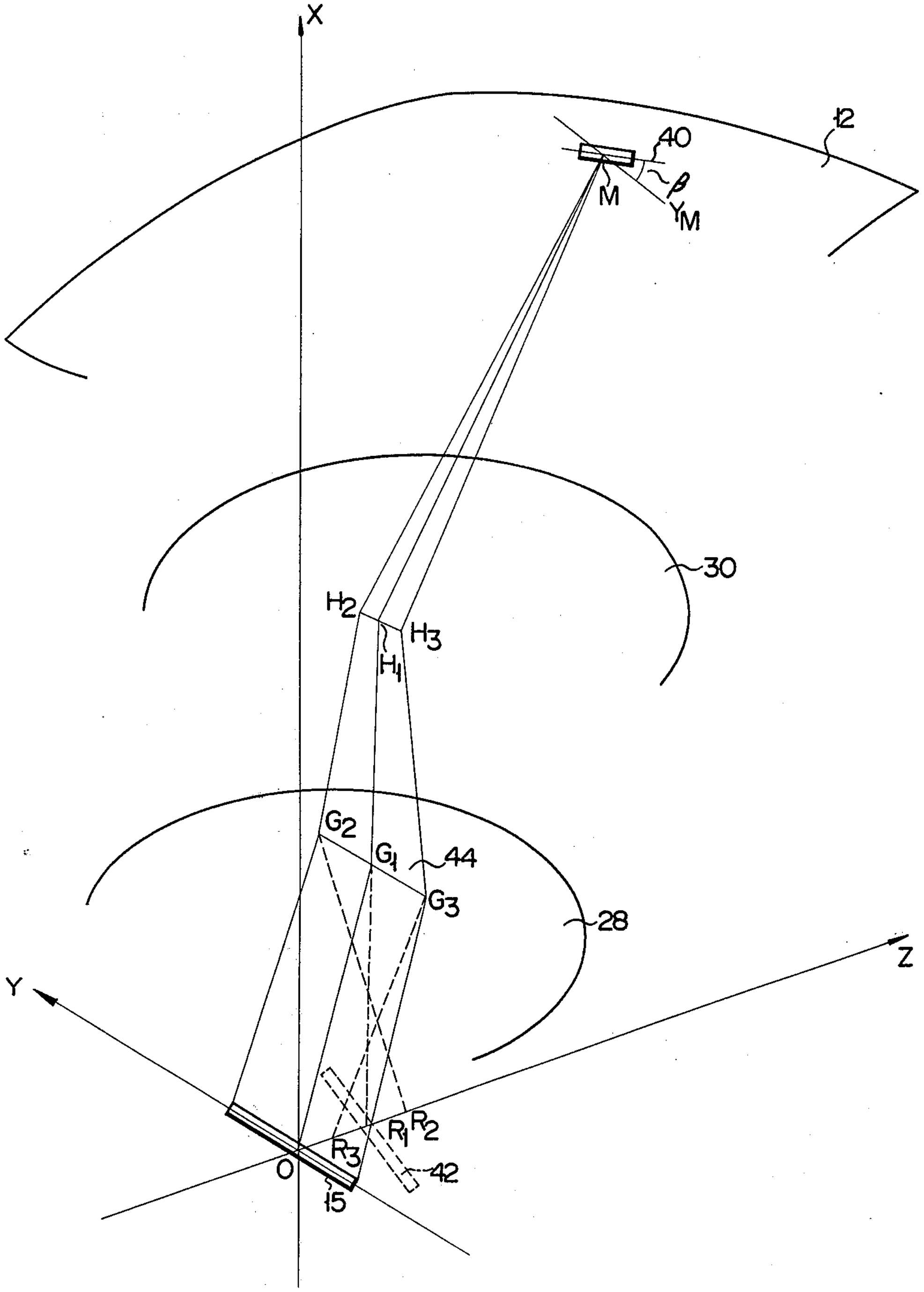
FIG. 5 is a three-dimensional representation of the manner in which the image of an elongated light source is projected by the first and second correction lenses used with the exposure device of the invention.

There will now be described by reference to FIGS. 5 and 6 the function of the first and second correction lenses 28, 30. Theoretically, the first correction lens 28 is chiefly intended to correct the distortion of the elongated light source 15. Namely, the first correction lens 28 corrects the position of the image of the elongated source 15 in order to cause the virtual image thereof as viewed through the first and second correction lenses 28, 30 to be set parallel with the slit aperture 14. The second correction lens 30 is chiefly used to ensure alignment between the locus of electron beams running through a color cathode ray tube and the light beam emitted from the elongated light source 15. The second correction lens 30 is designed to project a light on the photosensitive layer 36 so as to cause electron beams emitted from the in-line electron gun assembly 8 (FIG. 1) of a color cathode ray tube to land exactly on the phosphor stripes 18. These two correction lenses 28, 30 cooperate to control a light emitted from the elongated light source 15 so as to render two images 22, 24 projected on the photosensitive layer 36 of the luminescent screen 19 parallel with each other. The image 24 is a projection of the slit aperture 14 that is, an image formed on the screen 19 through the slit aperture 14 by a light emitted from the center of the elongated light source 15, namely, a light supposedly emitted from a point light source, if immovably set at the center of said elongated light source 15. The image 22 is a projection of the elongated light source 15 provided on the luminescent screen 19 by light rays collectively passing through a single point in the slit aperture 14. Accordingly, the two correction lenses 28, 30 cause a light to be projected straight forward with a uniform width on the photosensitive layer 36 of the luminescent screen 19, thereby forming straight phosphor stripes 18.

The curvature of the two correction lenses 28, 30 are concretely defined as follows. Referring to FIG. 5, let it be assumed that the longitudinal axis 40 of a given slit aperture 14 formed in the shadow mask 12 defined an angle $\beta$ having a certain relationship with the angle $\theta$ of spatial displacement (herein referred after to the displacement angle) (shown in FIG. 2) relative to the $Y_M$ axis passing through the center of the slit aperture 14, and that the elongated light source 15 is set on the Y axis with the center thereof represented by a base point 0. Then the slit aperture 14 has a spatial displacement relationship with the elongated light source 15. Where, under this condition, a light emitted from the elongated light source 15 and conducted through the slit aperture 14 is projected on the luminescent screen 19, then the image 24 of the slit aperture 14 and the image 22 of the elongated light source 15 are not disposed on the same axis, but intersect each other at the displacement angle $\theta$, as shown in FIG. 2 and FIG. 3. Where, however, the virtual image 42 of the elongated light source 15 provided by the first correction lens 28 an angle having the prescribed relationship with the displacement angle $\theta$, then the image 22 of the elongated light source 15 and the image 24 of the slit aperture 14 are formed on the luminescent screen 19 along the same axis, thereby preventing a phosphor stripes 18 from taking the zigzag form.

The first correction lens 28 projects the virtual image 42 of the enlongated light source 15 on the YZ plane. The correction lens system formed of the first and second correction lenses 28, 30 has the same function as in the case where the first correction lens 28 is removed, and the enlongated light source 15 is set at a position denoted by the referential numeral 42 at the prescribed angle to the Y axis which has a certain geometic relationship with the displacement angle $\theta$. When therefore, the elongated light source 15 is disposed at the point 42, then the optical characteristic of the second correction lens 30 is determined. Namely, the optical characteristic of the second correction lens is so designed as shown in FIG. 6, on the basis of the aforesaid virtual image position 42 that a light beam refracted by the second correction lens 30 is projected on that region of the luminescent screen 19 on which electron beams are to land through the slit aperture 14.

The displacement angle $\theta$ arises from the fact that the shadow mask 12 has a sightly curved plane. Therefore, the displacement angle $\theta$ is expressed in a continuous function due to relationship with the position of a slit aperture 14 on the shadow mask 12. This means that the curvature of the first correction lens 28 which is based on the displacement angle $\theta$ expressed in a continuous function is similarly denoted by a continuous function. Referring to FIG. 5, let it be assumed that the image of the elongated light source 15 is projected toward the second correction lens 30 through a region on the first correction lens 28 which is represented by a straight line 44 whose center is designated as $G_1$. Referential numeral 42 of FIG. 5 shows the virtual image of the elongated light source 15 as viewed in the direction in which the image of said light source 15 is projected toward the second correction lens 30. In this case, a light beam sent forth from the center o of the elongated light source 15 passes through the center $G_1$ of the aforesaid straight line 44. That point on the virtual image 42 which corresponds to the center $G_1$ of the straight line 44 is denoted by referential numeral $R_1$. Further, let it be assumed that the image of the elongated light source 15 is projected toward the second correction lens 30 through a region expressed by a different straight line (not shown) whose center is indicated by $G_2$. In this case, the center of the virtual image of the elongated light source 15 which corresponds to the center o of said light source 15 is denoted by $R_2$. Similarly, the center of the virtual image of the elongated light source 15 projected toward the second correction lens 30 through a straight line whose center is designated as $G_3$ is shown by $R_3$. The respective central points have such relationship that on the Y axis, $G_1$ has a larger value than $G_3$, and $G_2$ has a larger value than $G_1$; and on the Z axis, $R_1$ has a larger value than $R_3$, and $R_2$ has a larger value than $R_1$. This means that the Z components of the displacements of the centers $R_1$, $R_2$, $R_3$ of the virtual images of the elongated light source 15 from the center o of said light source 15 are indicated in monotonically increased functions. Where determination is made of the particular direction in which the virtual image of the elongated light source 15 is to be projected by the first correction lens 28 and the prescribed angle defined by said virtual image with the Y axis, then the positions of the respective points on the curved plane of the first correction lens 28 can be defined. A plane is generally expressed by the following equation:

$$X_D = \Sigma A mn Y^m Z^n$$

Where the value of a constant Amn is determined with the abovementioned condition taken into account, then the value of $X_D$ can be determined from the coordinate values of Y and Z of the above equation. In the above equation, m and n denote integers, and Y and Z represent the respective coordinate points on the Y and Z axes. The above equation expresses symmetric planes with respect to the Y and X axes. The reason why the above equation is applicable to this invention is that if the center of the shadow mask 12 having the prescribed curved plane is set at the intersection of the Y and Z axes, then the slit apertures 14 of said shadow mask 12 can be arranged in symmetric relationship with respect to the Y and Z axes. The value of $X_D$ expressed by the above equation denotes that of the respective points on the X axis, namely, the positions of the respective points on the first and second correction lenses 28, 30 with the center thereof denoted by zero. The constant Amn is obviously determined in consideration of the refractive index of a material constituting the first correction lens 28, its thickness at the center and the later described relationship between the first and second correction lenses 28, 30 in many respects.

The curved plane of the second correction lens 30 is determined as follows. As seen from FIG. 5 and FIG. 6, the virtual image 42 of the elongated light source 15 projected by the first correction lens 28 defines the prescribed angle with the Y axis which has a certain relationship with the displacement angle $\theta$. The center of said virtual image 42 is designated as $R_1$. As viewed from point $H_1$ on the second correction lens 30, the elongated light source 15 is represented by the virtual image 42. The second correction lens 30 is designed to project the virtual image 42 through the slit aperture 14 on that region of the luminescent screen 19 on which electron beams are to land. As previously described, however, the first correction lens 28 provides different forms of virtual image 42 at different regions of a plane defined by the Y-Z axis. For the landing of electron beams exactly on the phosphor stripes 18 of the luminescent screen 19, the second correction lens 30 should correct the position of the virtual image 42 projected on the luminescent screen 19 which varies according to the direction in which said elongated light source 15 is viewed from the luminescent screen 19. Practically, the position of the point $H_1$ on the curved plane of the second correction lens 30 is determined in consideration of a distance $\Delta Z_1$ from the center o of the elongated light source 15 to the center $R_1$ of the virtual image 42 thereof. Regarding the aforesaid Z component alone, the coordinate position of a light beam emitted from the center o of the elongated light source 15 and conducted through the point $G_1$ on the first correction lens 28 is corrected by $\Delta Z_2$ at the point $H_1$ on the second correction lens 30. As the result, the light beam is deflected toward the center M of the slit aperture 14. The extent $\Delta Z_B$ by which the coordinate position of a light beam emitted from the center o of the enlongated light source 15 is corrected is expressed by the following equation:

$$\Delta Z_B = \Delta Z_2 - \Delta Z_1$$

In this case, $\Delta Z_B$ is made to have a value coincident with the degree to which electron beams running through a cathode ray tube are intentionally displaced. If the coordinate position of a light beam which has passed through the point $G_1$ on the first correction lens 28 is corrected by $\Delta Z_2$ ($\Delta Z_2 = \Delta Z_B - \Delta Z_1$) at the point $H_1$ on the curved plane of the second correction lens 30, then the coordinate position of the light beam which has been conducted through the second correction lens 30 coincides with the intentionally defined orbit of electron beams travelling through a color cathode ray tube, and proceeds toward the shadow mask 12. As in the case of the first correction lens 28, the curvature of the second correction lens 30 can be defined of a constant Amn included in the equation $X_D = \Sigma A mn Y^m Z^n$ used to denote a plane is determined with the above-mentioned condition taken into account.

As apparent from the foregoing description, the first correction lens 28 is characterized in that the extent $\Delta Z_1$ by which the coordinate position of a light beam projected on a plane parallel with the Y axis indicates a monotonic increment with respect to the Y axis. Though the correction extent $\Delta Z_1$ given in said monotonous increment only occurs in the first quadrant, yet it is easy to anticipate said correction extent $\Delta Z_1$ in the other quadrants which are disposed mutually symmetric with respect to Y or Z axis. Referring now to FIG. 6, let it be assumed that the extent $\Delta Z_1$ of correction by the first correction lens 28 is taken to have a positive value and indicate a monotonic increment with respect to the Y axis, and that the extent $\Delta Z_2$ ($\Delta Z_2 = \Delta Z_B + \Delta Z_1$) of correction by the second correction lens 30 is taken to have a negative value. Then, if the correction extent $\Delta Z_B$ of the coordinate position of a light beam emitted from the center o of the elongated light source 15 is made to have a constant value in order to attain coincidence between the orbit of electron beam running through a color cathode ray tube and the path of a light beam, it is possible optionally to select the values of the extents $\Delta Z_1$ and $\Delta Z_2$ ($\Delta Z_2 = \Delta Z_B + \Delta Z_1$) of the correction effected by the first and second correction lens 28, 30. Therefore, the rotation angle of a virtual image of the elongated light source 15 having the prescribed relationship with the angle $\theta$ of spatial displacement can be freely controlled.

There will now be described a modification of the foregoing embodiment. Namely, the positions of the first and second correction lenses 28, 30 may be interchanged, that is, the second correction lens 30 may be disposed nearer to the elongated light source 15 than the first correction lens 28. As shown in FIGS. 4 to 6, however, the first correction lens 28 should preferably be positioned fully closer to the elongated light source 15 than the second correction lens 30. This arrangement more effectively fulfills the object of this invention. The reason is that, as seen from FIG. 5, the image of the elongated light source 15 passes through the smaller region of the second correction lens 30 than the smaller region of the second correction lens 30 than that of the first correction lens 28. A difference between the extent by which the coordinate position of a light beam passing through one of two closely spaced points is corrected by refraction and the extent by which the coordinate position of another light beam conducted through the other point is corrected similarly by refraction is much smaller than a difference between the extent by which the coordinate position of a light beam travelling through one of two remotely spaced points is corrected by refraction and the extent by which the coordinate position of another light beam carried through the other point is corrected similarly by refraction. This means that an image of a light source tends to be more distorted, as the light is sent through a larger region of a correction lens. Though the first correction lens 28 distorts an image of the elongated light source 15, yet the second correction lens 28 should not distort said image. For this reason, the first and second correction lenses 28, 30 are preferred to take the aforesaid positions. Thus, the exposure device of this invention having a simple construction as shown in FIG. 4 has the advantages that straight forward stripes 18 can be formed in the vertical direction of the luminescent screen 19, without taking the zigzag form particularly in the four corners of the face plate 10, thereby improving the color purity of said corners; and the photosensitive layer 36 on the luminescent screen 19 is fully exposed to a light by projecting it only once, minimizing time of exposure to light and elevating work efficiency.

As mentioned above, this invention provides an exposure device for making a stripe screen on a face plate of a color cathode ray tube which enables said cathode ray tube to have an excellent color purity characteristic.

What we claim is:

1. An exposure device for making a stripe screen on a panel section of a color cathode ray tube, said panel section including a shadow mask having a large number of slit apertures therein, said device comprising:

an elongated light source;

table means having an opening for allowing the passage of light emitted from said source and a mounting section for mounting said panel;

a first correction lens disposed between said source and said panel, said first lens having a central portion through which the optical axis of the lens passes and an outlying portion, said outlying portion including means for refracting light from said source toward said axis, forming a first virtual image, the center of the longitudinal axis of said first image being displaced in a first direction from the center of the longitudinal axis of said light source, and the longitudinal axis of said first image being inclined with respect to said light source; and a second correction lens disposed between said first lens and said panel, said second lens having a central portion through which the optical axis of the lens passes and an outlying portion, said outlying portion including means for refracting light having passed through said first lens away from said axis, forming a second virtual image, the center of the longitudinal axis of said second image being displaced in a second direction opposite said first direction from the center of the longitudinal axis of said first image, to correct the displacement of the image of said light source and project the image of said light source on to the faceplate along the locus of electron beams passing in said color cathode ray tube.

2. The exposure device according to claim 1, wherein the first correction lens has such a lenticular plane as causes the virtual image of the elongated light source to be parallel with the respective slit apertures of the shadow mask fitted to the panel section of the color cathode ray tube.

3. The exposure device according to claim 1, wherein the second correction lens has such a lenticular plane as is defined by the extent by which the virtual image of the elongated light source projected by the first correction lens on the second correction lens is displaced from the actual image of the elongated light source and the position of a slit aperture through which the virtual image of the elongated light source is projected on the shadow mask.

4. The exposure device according to claim 1, wherein, in a three-dimensional coordinate system formed of an X axis passing through the center of the elongated light source and the first correction lens, a Y axis represented by the longitudinal axis of the elongated light source and a Z axis intersecting the X and Y axes at right angles and passing through the center of the elongated light source, the first correction lens has such a surface as causes the extent $\Delta Z_1$ by which the coordinate position of a light beam is corrected by refraction in that plane of said first correction lens which is parallel with the Y axis to monotically increase with respect to any Y coordinate point in the first quadrant of said three dimensional coordinate system; and said surface quadrant is symmetric with the surface of the second, third and fourth quadrants with respect to the Y and Z axis.

5. A method of exposing strips on a panel section of a color cathode ray tube to avoid distortion in the corners of said cathode ray tube, said panel section including a shadow mask having a large number of slit apertures therein, said method comprising the steps of:

directing light from an elongated light source toward said panel;

refracting said light with an outer portion of a first correction lens disposed between said source and said panel toward the optical axis of said first lens, forming a first virtual image, the center of the longitudinal axis of said first image being displaced in a first direction from the center of the longitudinal axis of said light source, and the longitudinal axis of said first image being inclined with respect to said light source; and refracting said light having passed through said first lens with an outer portion of a second correction lens disposed between said first lens and said panel away from the optical axis of said second lens, forming a second virtual image, the center of the longitudinal axis of said second image being displaced in a second direction opposite said first direction from the center of the longitudinal axis of said first image, to correct the displacement of the image of said light source and project the image of said light source on to said panel along the locus of electron beams passing in said color cathode ray tube.

* * * * *